(12) United States Patent
Lee et al.

(10) Patent No.: US 9,964,827 B1
(45) Date of Patent: May 8, 2018

(54) LIGHT CONTROL DEVICE AND DISPLAY DEVICE USING THE SAME

(71) Applicant: a.u. Vista, Inc., Milpitas, CA (US)

(72) Inventors: Seok-Lyul Lee, Hsin-chu (TW); Fang-Chen Luo, Milpitas, CA (US)

(73) Assignee: A.U. VISTA, INC., Milpitas, CA (US)

( * ) Notice: Subject to any disclaimer, the term of this patent is extended or adjusted under 35 U.S.C. 154(b) by 0 days. days.

(21) Appl. No.: 15/652,818

(22) Filed: Jul. 18, 2017

(51) Int. Cl.
| | | |
|---|---|---|
| *H01L 33/00* | (2010.01) | |
| *C09K 11/62* | (2006.01) | |
| *G02F 1/137* | (2006.01) | |
| *G02F 1/1334* | (2006.01) | |
| *G02F 1/1343* | (2006.01) | |
| *G02F 1/139* | (2006.01) | |
| *G02F 1/133* | (2006.01) | |
| *G02F 1/1347* | (2006.01) | |
| *F21V 8/00* | (2006.01) | |
| *G02F 1/1333* | (2006.01) | |
| *G02F 1/1335* | (2006.01) | |

(52) U.S. Cl.
CPC ....... *G02F 1/13725* (2013.01); *G02B 6/0073* (2013.01); *G02F 1/139* (2013.01); *G02F 1/1334* (2013.01); *G02F 1/13306* (2013.01); *G02F 1/13439* (2013.01); *G02F 1/13471* (2013.01); *G02F 2001/13345* (2013.01); *G02F 2001/13712* (2013.01); *G02F 2001/13756* (2013.01); *G02F 2001/133302* (2013.01); *G02F 2001/133626* (2013.01); *G02F 2202/04* (2013.01); *G02F 2202/28* (2013.01); *G02F 2203/03* (2013.01)

(58) Field of Classification Search
CPC .... F21S 48/1145; F21S 48/328; F21S 48/125; C09K 11/7774; C09K 11/025; C09K 11/62; C09K 11/7728; H01S 5/34333; H01S 5/005; B60Q 1/04; H01L 2933/0091; H01L 33/0045; H01L 33/32; H01L 33/501; H01L 33/504; H01L 33/502; H01L 33/507; H01L 33/508
See application file for complete search history.

(56) References Cited

U.S. PATENT DOCUMENTS

| | | | |
|---|---|---|---|
| 7,446,835 B2 | 11/2008 | Ukawa | |
| 2017/0306221 A1* | 10/2017 | Koole | C09K 11/025 |

\* cited by examiner

*Primary Examiner* — Joseph L Williams
*Assistant Examiner* — Jose M Diaz
(74) *Attorney, Agent, or Firm* — Tim Tingkang Xia, Esq.; Locke Lord LLP (57) ABSTRACT

A light control device and a display device using the same. The light control device includes a polymer networked liquid crystal (PNLC) or polymer dispersed liquid crystal (PDLC) display switchable between a scattering state and a first display state, and a guest-host (G-H) liquid crystal display (LCD) switchable between a transparent state and a second display state. A light source of the G-H LCD is disposed at a side of the PNLC or PDLC display and aligned to its liquid crystal layer. In a first operational mode, the PNLC or PDLC display is switched to the first display state, and the G-H LCD is switched to the transparent state and becomes transparent. In a second operational mode, the G-H LCD is switched to the second display state, and the PNLC or PDLC display is switched to the scattering state to function as a light guide layer for the G-H LCD.

20 Claims, 9 Drawing Sheets

LIGHT CONTROL DEVICE AND DISPLAY DEVICE USING THE SAME

FIELD

The disclosure relates generally to display technology, and more particularly to a light control device and a display device using the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A display device may include light control features that allow the display device to be switchable between different display modes, including one display mode for a bright environment (such as an outdoor area during the day time or a bright room) where external light from the environment may be used by the display device, and another display mode for a dark environment (such as an indoor dark room or a dark area during the night time) where low environment light is available. However, a challenge exists to maintain the respective optical performance of the display device with such light control features in the different display modes.

Therefore, a heretofore unaddressed need exists in the art to address the aforementioned deficiencies and inadequacies.

SUMMARY

One aspect of the disclosure relates to a display device, which includes a black film; and a light control display stack disposed on the black film. The light control display stack includes: a polymer networked liquid crystal (PNLC) or polymer dispersed liquid crystal (PDLC) display disposed on the black film; and a guest-host (G-H) liquid crystal display (LCD) disposed on the PNLC or PDLC display and facing an outer environment. The PNLC or PDLC display defines a plurality of first pixels and is switchable between a scattering state and a first display state. In the first display state, each of the plurality of first pixels of the PNLC or PDLC display is configured to be turned on to become transparent or be turned off to become translucent, and in the scattering state, each of the plurality of first pixels of the PNLC or PDLC display is configured to be turned off. The G-H LCD defines a plurality of second pixels and is switchable between a transparent state and a second display state. In the second display state, each of the plurality of second pixels of the G-H LCD is configured to be turned off to transmit light emitted internally by a light source of the G-H LCD or be turned on to become opaque, and in the transparent state, each of the plurality of second pixels of the G-H LCD is configured to be turned off to become transparent. In a first operational mode, the PNLC or PDLC display is configured to switch to the first display state for displaying image data, and the G-H LCD is configured to switch to the transparent state and becomes transparent, such that light from the outer environment is allowed to incident to and pass through the G-H LCD in the transparent state and reflected by the first pixels of the PNLC or PDLC display being turned on in the first display state. In a second operational mode, the G-H LCD is configured to switch to the second display state for displaying the image data, and the PNLC or PDLC display is configured to switch to the scattering state to function as a light guide layer for the G-H LCD, such that the light emitted internally by the light source of the G-H LCD is guided by the PNLC or PDLC display in the scattering state toward the G-H LCD in the second display state.

In certain embodiments, the light control display stack further comprises an adhesive layer disposed between the PNLC or PDLC display and the G-H LCD, such that no air gap exists between the PNLC or PDLC display and the G-H LCD.

In certain embodiments, the display device further includes a glass layer disposed on the G-H LCD facing the outer environment.

In certain embodiments, the PNLC or PDLC display includes: a first substrate disposed on the black film; a second substrate facing the G-H LCD and spaced apart to the first substrate, forming a first cell gap between the first substrate and the second substrate; and a liquid crystal layer disposed in the first cell gap between the first substrate and the second substrate and having PNLC or PDLC molecules, the liquid crystal layer defining a plurality of first pixels, wherein the PNLC or PDLC molecules are formed by dissolving or dispersing liquid crystal molecules into liquid polymers, and solidifying or curing the liquid polymers to form the PNLC or PDLC molecules. In certain embodiments, each of the plurality of first pixels includes: a first transparent electrode disposed on the first substrate and facing the liquid crystal layer; and a second transparent electrode disposed on the second substrate and facing the liquid crystal layer. When the PNLC or PDLC display is switched to the first display state, for each of the plurality of first pixels, the first transparent electrode and the second transparent electrode are provided with a voltage difference to form an electric field to control the alignment of the PNLC or PDLC molecules between the first transparent electrode and the second transparent electrode of the first pixel, such that each of the plurality of first pixels is configured to be turned on to become transparent or be turned off to become translucent. When the PNLC or PDLC display is switched to the scattering state, for each of the plurality of first pixels, the first transparent electrode and the second transparent electrode are not provided with the voltage difference, such that the PNLC or PDLC molecules of all of the plurality of first pixels are randomly arranged, and the light is scattered and diffused when passing through the PNLC or PDLC display such that the light is guided toward the G-H LCD.

In certain embodiments, the G-H LCD includes: a third substrate facing the PNLC or PDLC display; a fourth substrate facing the outer environment and spaced apart to the third substrate, forming a second cell gap between the third substrate and the fourth substrate; and a G-H liquid crystal layer disposed in the second cell gap between the third substrate and the fourth substrate and having G-H liquid crystal molecules, the G-H liquid crystal layer defining a plurality of second pixels, wherein the G-H liquid crystal molecules includes negative liquid crystal molecules as host and dichroic dye molecules as guest dissolved in the negative liquid crystal molecules, such that orientations of the dichroic dye molecules and dipoles are parallel to the negative liquid crystal molecules. In certain embodiments, each of the plurality of second pixels includes: a third transparent electrode disposed on the third substrate and facing the G-H liquid crystal layer; and a fourth transparent electrode disposed on the fourth substrate and facing the G-H liquid crystal layer. When the G-H LCD is switched to the second display state, the light source is turned on, and for each of the plurality of second pixels, the third transparent electrode and the fourth transparent electrode are either provided with a voltage difference to form an electric field to control alignment of the G-H liquid crystal molecules to turn on the second pixel, or not provided with the voltage difference such that the second pixel is turned off, such that the light emitted by the light source and guided by the PNLC or PDLC display in the scattering state is allowed to pass through at least some of the plurality of second pixels being turned off. When the G-H LCD is switched to the transparent state, the light source is turned off, and for each of the plurality of second pixels, the third transparent electrode and the fourth transparent electrode are not provided with the voltage difference, such that the G-H liquid crystal molecules of all of the second pixels are arranged to be transparent.

In certain embodiments, the light source is configure to emit the light toward the G-H LCD, and the light source is a light-emitting diode (LED) chip disposed at a side of the PNLC or PDLC display. In one embodiment, the LED chip includes a plurality of LEDs having red (R), green (G) and blue (B) colors.

A further aspect of the disclosure relates to a light control device, which includes: a first display panel, defining a plurality of first pixels and being switchable between a scattering state and a first display state; and a second display panel disposed on the first display panel and facing an outer environment, the second display panel defining a plurality of second pixels and being switchable between a transparent state and a second display state. In the first display state, each first pixel of the first display panel is configured to be turned on to become transparent or be turned off to become translucent, and in the scattering state, each first pixel of the first display panel is configured to be turned off. In the second display state, each second pixel of the second display panel is configured to be turned off to transmit light emitted internally by a light source of the second display panel or be turned on to become opaque, and in the transparent state, each second pixel of the second display panel i is configured to be turned off to become transparent. In a first operational mode, the first display panel is configured to switch to the first display state for displaying image data, and the second display panel is configured to switch to the transparent state and becomes transparent, such that light from the outer environment is allowed to incident to and pass through the second display panel in the transparent state and reflected by the first pixels of the first display panel being turned on in the first display state. In a second operational mode, the second display panel is configured to switch to the second display state for displaying the image data, and the first display panel is configured to switch to the scattering state to function as a light guide layer for the second display panel, such that the light emitted internally is guided by the first display panel in the scattering state toward the second display panel in the second display state.

In certain embodiments, no air gap exists between the first display panel and the second display panel. In certain embodiments, the light control device further includes an adhesive layer disposed between the first display panel and the second display panel, such that a display stack is formed by laminated layers of the first display panel, the adhesive layer and the second display panel.

In certain embodiments, the light control device further includes a black film, wherein the first display panel is disposed on the black film.

In certain embodiments, the first display panel is a PNLC display or a PDLC display, which includes: two substrates spaced apart to each other, forming a first cell gap therebetween; and a liquid crystal layer disposed in the first cell gap between the two substrates and having PNLC or PDLC molecules, the liquid crystal layer defining a plurality of first pixels, wherein the PNLC or PDLC molecules are formed by dissolving or dispersing liquid crystal molecules into liquid polymers, and solidifying or curing the liquid polymers to form the PNLC or PDLC molecules. When the first display panel is switched to the first display state, for each of the plurality of first pixels, a voltage difference is provided to the first pixel to control alignment of the PNLC or PDLC molecules of the first pixel, such that each of the plurality of first pixels is configured to be turned on to become transparent or be turned off to become translucent. When the first display panel is switched to the scattering state, the PNLC or PDLC molecules of all of the first pixels are randomly arranged, and the light is scattered and diffused when passing through the first display panel such that the light is guided toward the second display panel.

In certain embodiments, each of the plurality of first pixels includes: a first transparent electrode disposed on one of the two substrates and facing the liquid crystal layer; and a second transparent electrode disposed on the other of the two substrates and facing the liquid crystal layer. When the first pixel is turned on, the first transparent electrode and the second transparent electrode are provided with the voltage difference to form an electric field to control the alignment of the PNLC or PDLC molecules between the first transparent electrode and the second transparent electrode. When the first pixel is turned off, the first transparent electrode and the second transparent electrode are not provided with the voltage difference, such that the PNLC or PDLC molecules between the first transparent electrode and the second transparent electrode are randomly arranged.

In certain embodiments, the second display panel is a guest-host (G-H) liquid crystal display (LCD), which includes: two substrates spaced apart to each other, forming a second cell gap therebetween; and a G-H liquid crystal layer disposed in the second cell gap between the two substrates and having G-H liquid crystal molecules, the G-H liquid crystal layer defining a plurality of second pixels, wherein the G-H liquid crystal molecules comprise negative liquid crystal molecules as host and dichroic dye molecules as guest dissolved in the negative liquid crystal molecules, such that orientations of the dichroic dye molecules and dipoles are parallel to the negative liquid crystal molecules. When the second display panel is switched to the second display state, the light source is turned on, and for each of the plurality of second pixels, either a voltage difference is provided to the second pixel to control alignment of the G-H liquid crystal molecules to turn on the second pixel, or no voltage difference is provided to the second pixel to turn off the second pixel, such that the light emitted by the light source and guided by the first display panel in the scattering state is allowed to pass through at least some of the second pixels being turned off. When the second display panel is switched to the transparent state, the light source is turned off, and for each of the plurality of second pixels, the G-H liquid crystal molecules of all of the second pixels are arranged to be transparent.

In certain embodiments, each of the plurality of second pixels includes: a third transparent electrode disposed on one of the two substrates and facing the G-H liquid crystal layer; and a fourth transparent electrode disposed on the other of the two substrates and facing the G-H liquid crystal layer.

When the second pixel is turned on, the first transparent electrode and the second transparent electrode are provided with the voltage difference to form an electric field to control alignment of the G-H liquid crystal molecules between the third transparent electrode and the fourth transparent electrode. When the second pixel is turned off, the third transparent electrode and the fourth transparent electrode are not provided with the voltage difference, such that the G-H liquid crystal molecules between the third transparent electrode and the fourth transparent electrode are arranged to be transparent.

In certain embodiments, the light source is configure to emit the light toward the second display panel, and the light source is a light-emitting diode (LED) chip disposed at a side of the PNLC or PDLC display. In one embodiment, the LED chip includes a plurality of LEDs having red (R), green (G) and blue (B) colors.

In a further aspect of the disclosure, a display device is provided, which includes a black film and a light control display stack disposed on the black film. The light control display stack includes: a first display panel disposed on the black film, and being switchable between a scattering state and a display state; and a second display panel disposed on the first display panel and facing an outer environment, the second display panel being switchable between a transparent state and a second display state. The first display panel includes a liquid crystal layer, and the second display panel includes a light-emitting diode (LED) light source disposed at a side of the first display panel and aligned to the liquid crystal layer of the first display panel.

In certain embodiments, the first display panel is a polymer networked liquid crystal (PNLC) or polymer dispersed liquid crystal (PDLC) display, and the second display panel is a guest-host (G-H) liquid crystal display (LCD).

In certain embodiments, the display device as discussed above may improve visibility performance in both the bright environment and the dark environment.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE DISCLOSURE

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a light control device and a display device using the same.

As disclosed above, there is a trend for a display device with light control features that allow the display device to be switchable between a bright display mode for a bright environment (such as an outdoor environment during the day time or a bright room) where light from the environment may be used by the display device, and a dark display mode for a dark environment (such as an indoor dark room or a dark area during the night time) where no environment light is available. In some cases, such a display device may be achieved by a light control stack having two display panels, with one display panel being used to display the images in the bright environment, and the other display panel being used to display the images in the dark environment.

Figure 1:
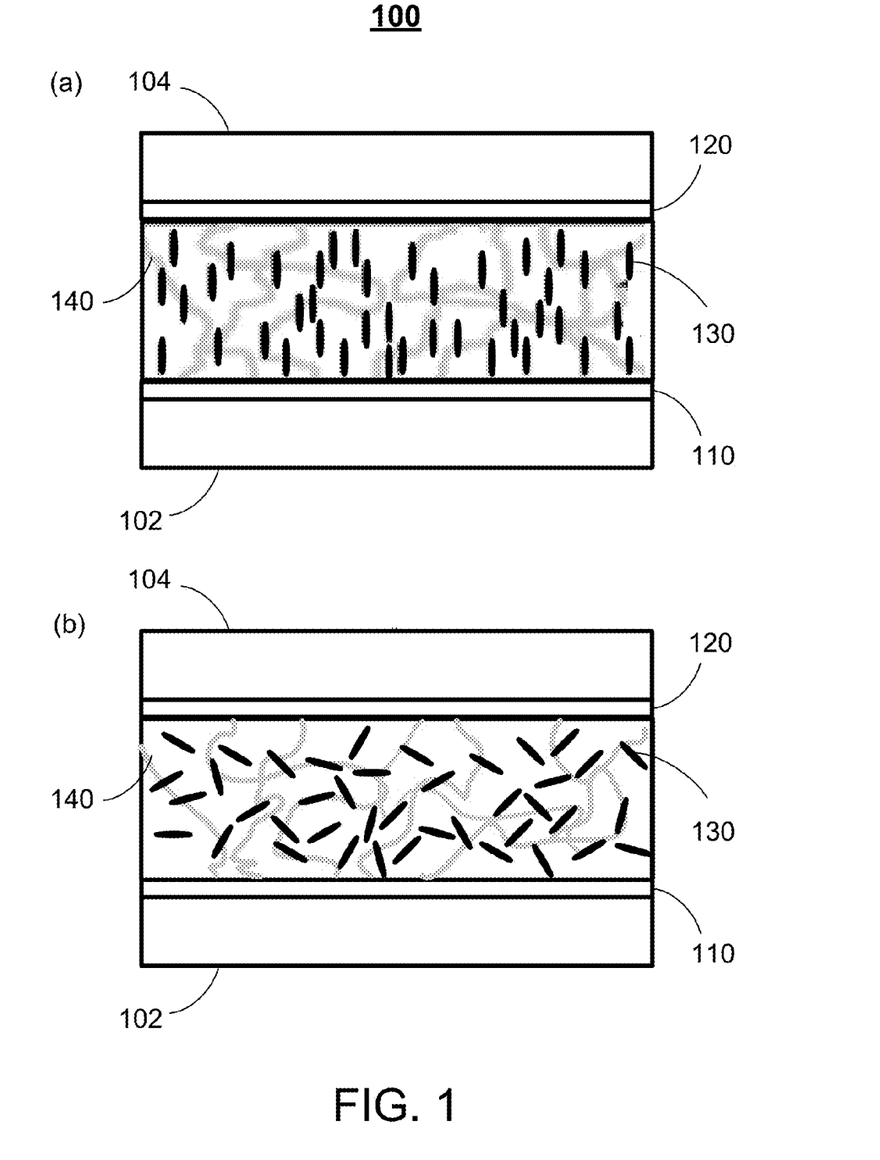
FIG. 1 schematically shows a PNLC device in (a) a transparent mode and (b) a scattering mode according to certain embodiments of the present disclosure.
Figure 2:
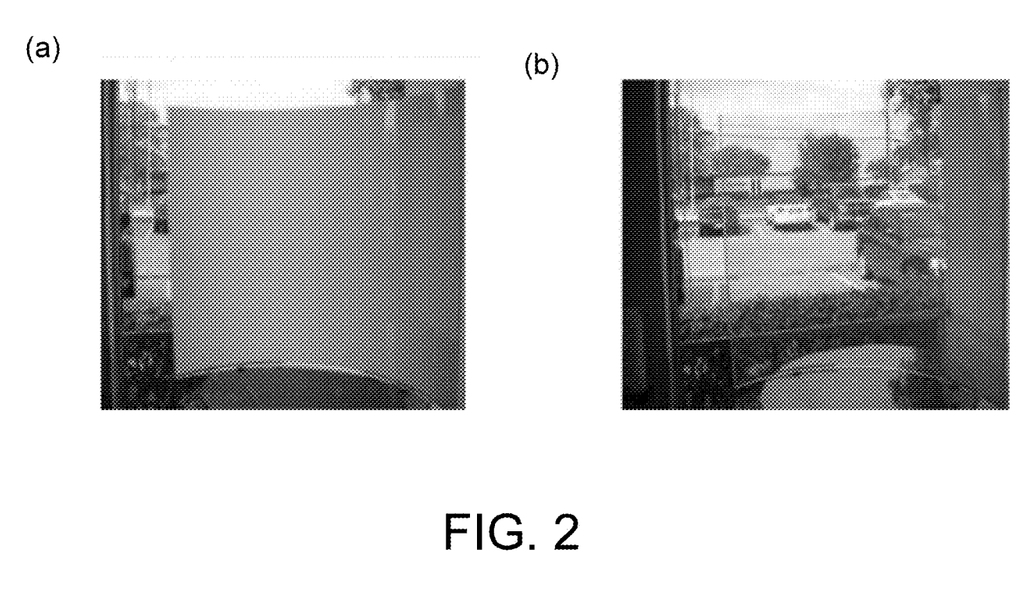
FIG. 2 schematically shows (a) a photo of a PNLC device in the scattering mode, and (b) a photo of a PNLC device in a transparent mode, according to certain embodiments of the present disclosure.

In certain embodiments, a polymer-networked liquid crystal (PNLC) display or a polymer-dispersed liquid crystal (PDLC) display may be used as the other of the display panels. In particular, in the PNLC or PDLC display, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. FIG. 1 schematically shows a PNLC device in (a) a transparent mode and (b) a scattering mode according to certain embodiments of the present disclosure, and FIG. 2 schematically shows (a) a photo of a PNLC device in the scattering mode, and (b) a photo of a PNLC device in a transparent mode, according to certain embodiments of the present disclosure. As shown in FIG. 1, the PNLC device 100 includes two glass substrates 102 and 104, a first transparent electrode 110, and a second transparent electrode 120. When a voltage difference is provided between the first transparent electrode 110 and the second transparent electrode 120 to form an electric field, alignment of the molecules in the PNLC layer (including the PNLC molecules/droplets 130 and the solid polymers 140) may be controlled by the electric field, as shown in FIG. 1(a). In this case, light is allowed to pass through the cell without scattering and resulting in a transparent mode, as shown in FIG. 2(b). On the other hand, when no voltage difference is applied to the transparent electrodes of the PNLC device 100, the liquid crystals are randomly arranged in the cell as shown in FIG. 1(b), which results in scattering of light as the light passes through the cell. This results in a translucent, "milky white" appearance of the PNLC device, as shown in FIG. 2(a). In certain embodiments, the degree of transparency of the PNLC device can be controlled by the applied voltage difference. For example, the PNLC device may be a transparent and reflective display, or may be a transparent display.

Figure 3:
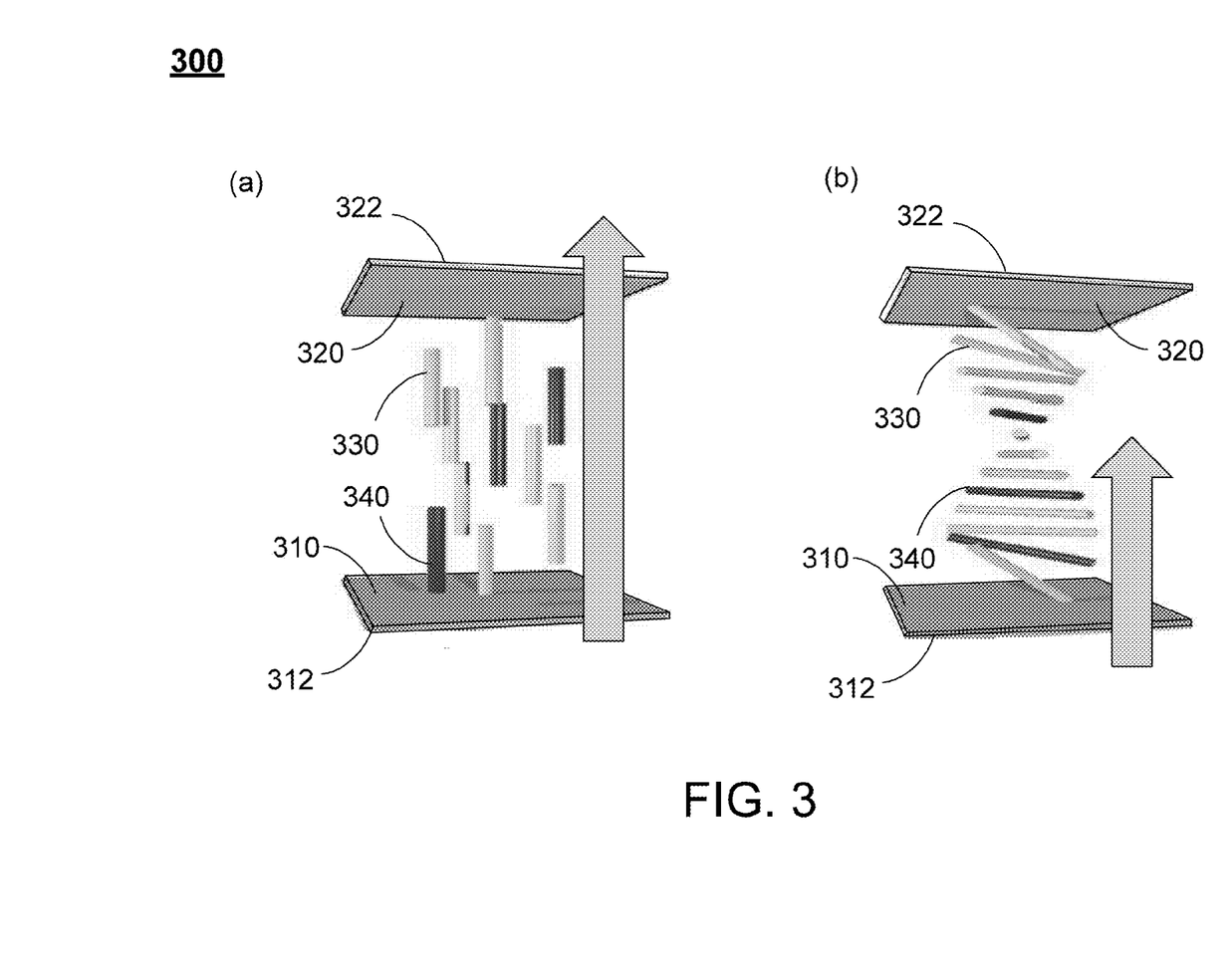
FIG. 3 schematically shows a G-H LCD in (a) a transparent mode and (b) an opaque mode according to certain embodiments of the present disclosure.

In certain embodiments, a guest-host (G-H) liquid crystal display (LCD), which utilizes a G-H technology with homeotropic alignment layer, negative LC molecules as host and dichroic dye molecules as guest, may be used as one of the display panels. FIG. 3 schematically shows a G-H LCD in (a) a transparent mode and (b) an opaque mode according to certain embodiments of the present disclosure. In certain embodiments, to achieve light transmission control, high order parameter dichroic dyes are dissolved in the host liquid crystals for the preparation of G-H liquid crystal molecules. As shown in FIG. 3, the G-H LCD 300 has a third transparent electrode 310 on a third substrate 312 and a fourth transparent electrode 320 on a fourth substrate 322, which may be provided with a voltage difference to form an electric field, such that alignment of the G-H liquid crystal molecules (including the host liquid crystal molecules 330 and the dye molecules 340) may be controlled by the electric field. As shown in FIG. 3(a), in the G-H LCD in the transparent mode (i.e., an OFF state), the orientation of the dye molecules and the subsequent dipoles are parallel to the host liquid crystal alignment, which is along a vertical direction substantially perpendicular to the G-H LCD 300. In this case, the G-H LCD 300 becomes transparent, thus allowing the transmission of the light through the G-H LCD 300. On the other hand, as shown in FIG. 3(b), applying of a voltage difference between the third transparent electrode 310 and the fourth transparent electrode 320 would reorient the LC molecules 330 and dye molecules 340, which alters the absorption of the light through the material, thus switching the G-H LCD 300 to the opaque mode (i.e., an ON state). In this case, light may be partially absorbed by the LC molecules 330 and dye molecules 340, thus enabling the G-H LCD 300 to display an image signal with different luminance levels.

Figure 4:
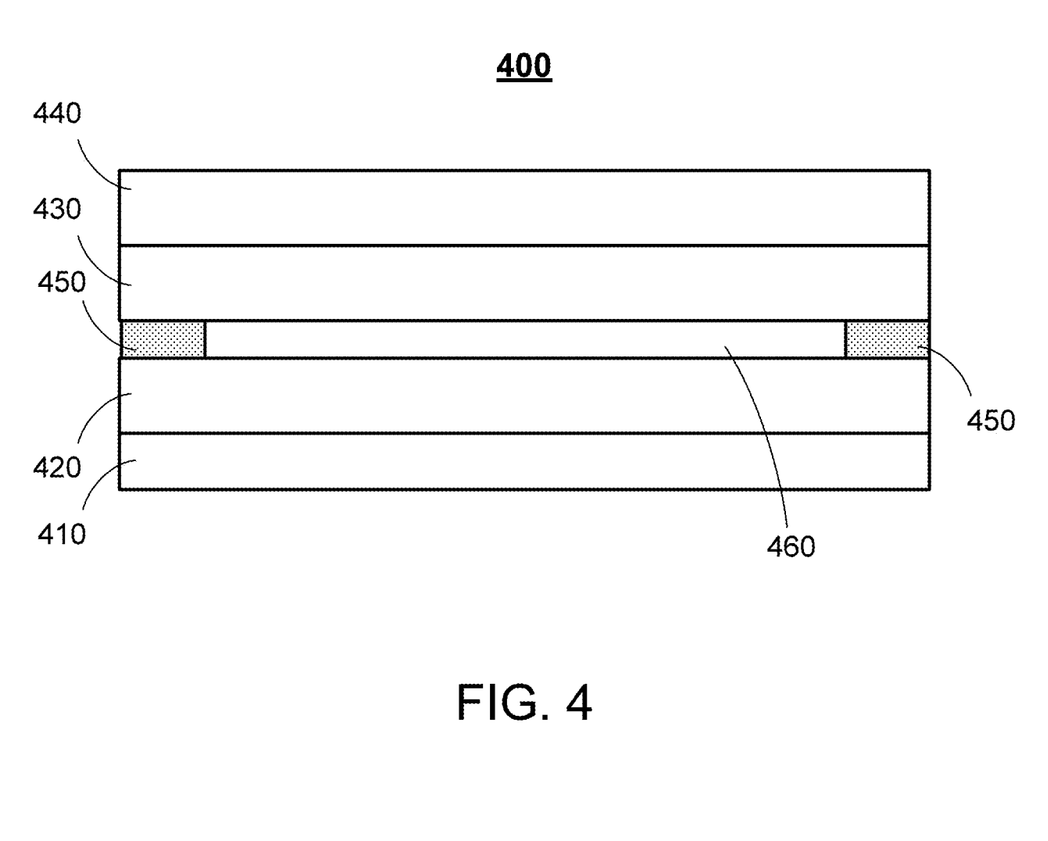
FIG. 4 schematically shows a display device formed by OLED and PNLC display according to certain embodiments of the present disclosure.

In certain embodiments, a light control device of a display device may be formed by combining an OLED device and a PNLC/PDLC device. In this case, the OLED device is used as a light source, and the PNLC/PDLC device may be switchable between a transparent mode and a light blocking mode (i.e., the scattering mode). FIG. 4 schematically shows a display device formed by OLED and PNLC display according to certain embodiments of the present disclosure. As shown in FIG. 4, the display device 400 includes an OLED layer 410, a circular polarizer layer 420, a PNLC display layer 430, and a cover glass layer 440 facing the outer environment. Further, an air gap 460 is formed between the circular polarizer layer 420 and the PNLC display layer 430, and the border area of the air gap 460 may be filled with a surrounding adhesive layer 450. In certain embodiments, when the display device 400 is in a bright environment, the PNLC display layer 430 is in a reflective mode, and the OLED layer 410 is turned off; and when the display device 400 is in a dark environment, the PNLC display layer 430 is in a transparent mode, and the OLED layer 410 is turned on to function as a light source.

Figure 5A:
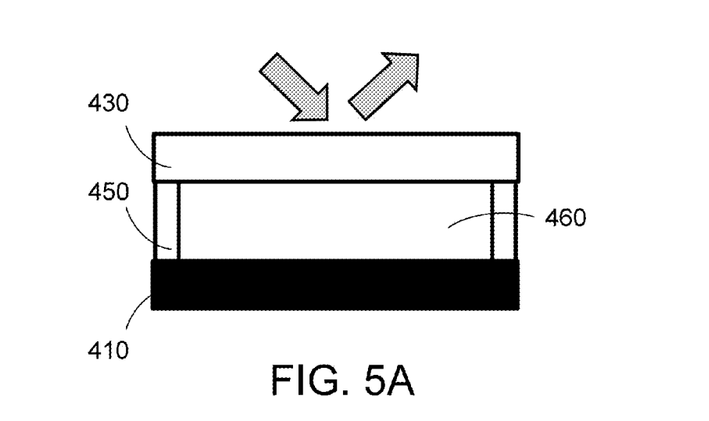
FIG. 5A schematically shows the display device as shown in FIG. 4 in a bright environment according to certain embodiments of the present disclosure.

FIG. 5A schematically shows the display device as shown in FIG. 4 in a bright environment according to certain embodiments of the present disclosure. As shown in FIG. 5A, only the OLED layer 410, the PNLC display layer 430 and the air gap 460 are shown. Specifically, when the display device 400 is in the bright environment, as shown in FIG. 5A, the external light is available, and the OLED layer 410 may be turned off (shown in black in FIG. 5A).

Figure 5B:
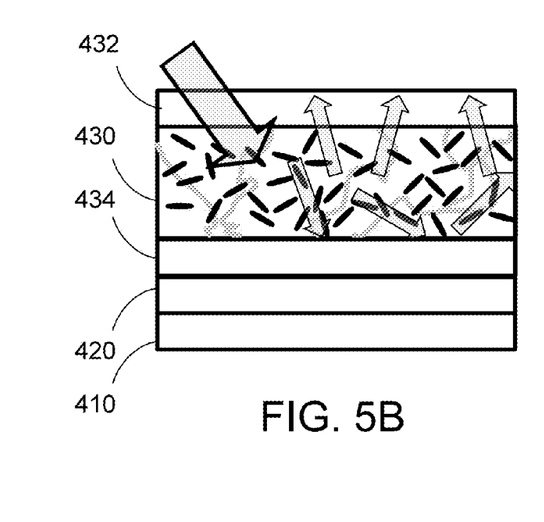
FIG. 5B schematically shows the display device in the bright environment displaying white according to certain embodiments of the present disclosure.
Figure 5C:
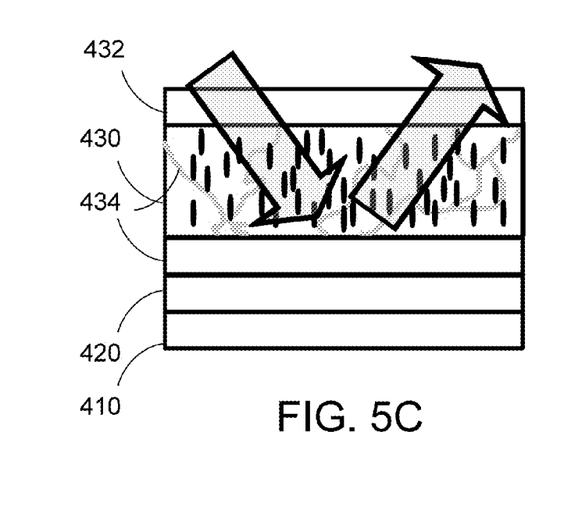
FIG. 5C schematically shows the display device in the bright environment displaying black according to certain embodiments of the present disclosure.

In certain embodiments, the PNLC display layer 430 in the bright environment may be controlled to display the white color or the black color. FIG. 5B schematically shows the display device in the bright environment displaying white according to certain embodiments of the present disclosure, and FIG. 5C schematically shows the display device in the bright environment displaying black according to certain embodiments of the present disclosure. Specifically, each of FIGS. 5B and 5C shows one pixel of the PNLC display layer 430. As shown in FIG. 5B, the pixel of the PNLC display layer 430 may be controlled to switch to the scattering state (i.e., the OFF state). In this case, no voltage difference is applied to the electrodes 432 and 434, and the PNLC molecules in the PNLC display layer 430 are randomly arranged in the cell, resulting in the external light being incident to the PNLC display layer 430 to be reflected in a scattering way toward a variety of directions, as shown in FIG. 5B. Thus, the human eye will perceive the transparent display device to display the white color. On the other hand, as shown in FIG. 5C, the pixel of the PNLC display layer 430 may be controlled to switch to the transparent state (i.e., the ON state) by applying a voltage difference between the electrodes 432 and 434 of the PNLC display layer 430. In this case, the electric field formed by the electrodes causes the PNLC molecules in the PNLC display layer 430 to align, allowing the external light being incident to the PNLC display layer 430 to be reflected outward, as shown in FIG. 5C. Thus, the human eye will perceive the display device to display the black color because the reflected light does not enter the human eye area.

Figure 6:
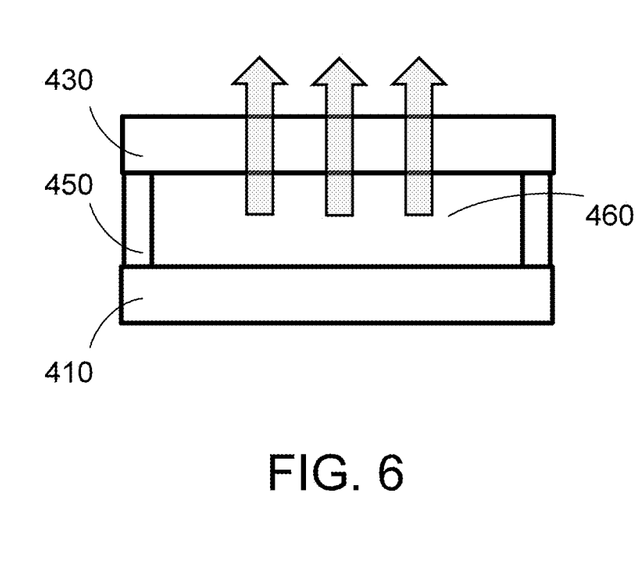
FIG. 6 schematically shows the display device as shown in FIG. 4 in a dark environment according to certain embodiments of the present disclosure.

FIG. 6 schematically shows the display device as shown in FIG. 4 in a bright environment according to certain embodiments of the present disclosure. As shown in FIG. 6, only the OLED layer 410, the PNLC display layer 430 and the air gap 460 are shown. Specifically, when the display device 400 is in the dark environment, as shown in FIG. 6, the external light is not available, and the OLED layer 410 may be controlled to function as a light source. In certain embodiments, the PNLC display layer 430 in the dark environment may be controlled to display white and non-white colors, based on the color of light emitted by the OLED layer 410. When the OLED layer 410 is turned on, the light emitted by the OLED layer 410 may pass through the PNLC display layer 430, thus showing an image. The image may be in a white color, or may be in any combination of the RGB color, depending on the color of the light emitted by the OLED layer 410. On the other hand, when the OLED layer 410 is turned off, no light is emitted by the OLED layer 410, and the human eye will perceive the display device to display the black color.

Although the display device 400 as shown in FIG. 4 includes the light control device by controlling the PNLC display layer 430 and the OLED layer 410, there are some problems with such a display device 400. For example, as shown in FIG. 4, the display device 400 has the air gap 460. Thus, the surrounding adhesive layer 450 at the border area of the air gap 460 becomes necessary to combine the PNLC display layer 430 and the OLED layer 410. Since a certain width of the border area is required to enable firm adhesion of the adhesive layer 450, the border area occupied by the adhesive layer 450 as well as the total area of the display device 400 become wider. Further, the thickness of the display device 400 increases due to the existence of the air gap 460. In this case, the OLED optical performance of the OLED layer 410 drops under ambient light, resulting in low transmittance and low contrast ratios of the display device 400.

One aspect of the present disclosure relates to a light control device, which may be used to form a display device. The light control device includes a first display panel, being switchable between a scattering state and a first display state; and a second display panel disposed on the first display panel and facing an outer environment, the second display panel being switchable between a transparent state and a second display state. In certain embodiments, the first display panel may be a PNLC or PDLC display which defines a plurality of first pixels. In the first display state, each of the plurality of first pixels of the PNLC or PDLC display is configured to be turned on to become transparent or be turned off to become translucent, and in the scattering state, each of the plurality of first pixels of the PNLC or PDLC display is configured to be turned off. Further, the second display panel may be a G-H LCD, which defines a plurality of second pixels. In the second display state, each of the plurality of second pixels of the G-H LCD is configured to be controlled to transmit light emitted internally by a light source of the G-H LCD, and in the transparent state, each of the plurality of second pixels of the G-H LCD is configured to be turned off to become transparent. In certain embodiments, no air gap exists between the first display panel and the second display panel. In a first operational mode (e.g., when the outer environment is a bright environment), the first display panel is switched to the first display state for displaying image data, and the second display panel is switched to the transparent state and becomes transparent, such that light from the bright environment is allowed to incident to and pass through the second display panel in the transparent state and reflected by the first pixels of the PNLC or PDLC display being turned on in the first display state. In a second operational mode (e.g., when the outer environment is a dark environment), the second display panel is switched to the second display state for displaying the image data, and the first display panel is switched to the scattering state to function as a light guide layer for the second display panel, such that light emitted internally is guided by the first display panel in the scattering state toward the second display panel in the second display state.

Figure 7:
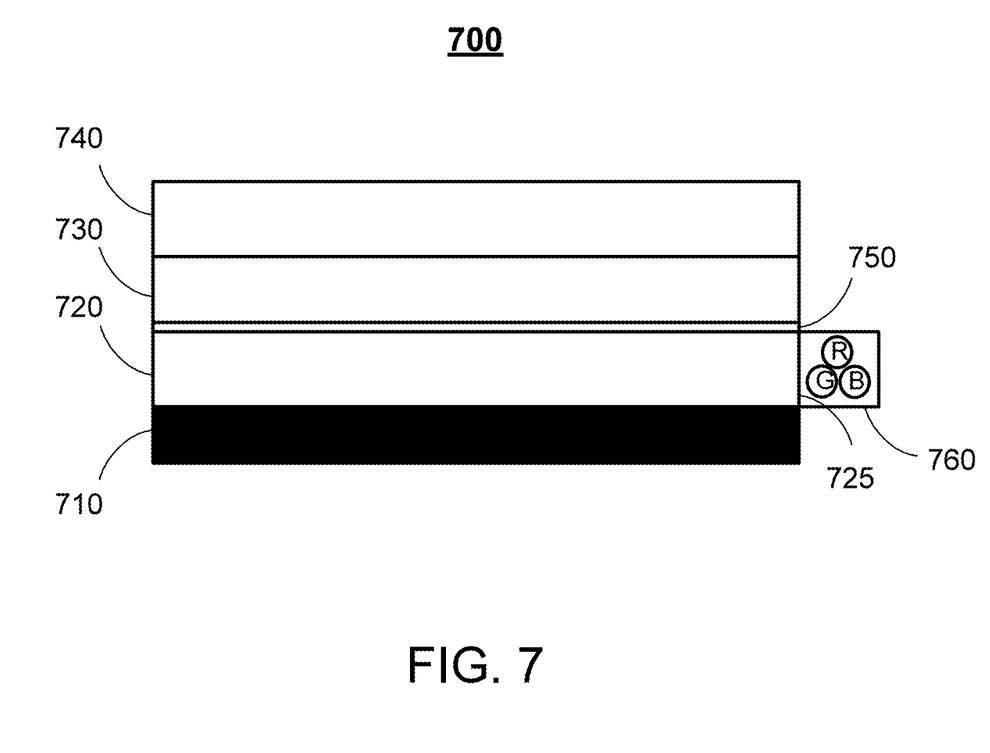
FIG. 7 shows a display device formed by G-H LCD and PNLC display according to certain embodiments of the present disclosure.

FIG. 7 shows a display device formed by G-H LCD and PNLC display according to certain embodiments of the present disclosure. As shown in FIG. 7, the display device 700 includes a black film 710, a PNLC display layer 720 disposed on the black film 710, a G-H LCD layer 730 disposed on the PNLC display layer 720, and a cover glass layer 740 disposed on the G-H LCD layer 730 and facing the outer environment. The PNLC display layer 720 functions as a first display panel, and the G-H LCD layer 730 functions as a second display panel. Optionally, an adhesive layer 750 is disposed between the PNLC display layer 720 (i.e., the first display panel) and the G-H LCD layer 730 (i.e., the second display panel). Further, a light-emitting diode (LED) chip 760 is disposed at a side 725 of the PNLC display layer 720 to function as a light source of the G-H LCD layer 730. In certain embodiments, the LED chip 760 is aligned to the liquid crystal layer of the PNLC display layer 720. In certain embodiments, the LED chip 760 may include a plurality of LEDs having red (R), green (G) and blue (B) colors, such that the LED chip 760 may be controlled to emit light in different RGB colors. It should be particularly noted that, regardless of the existence of the adhesive layer 750, there is no air gap between the PNLC display layer 720 (i.e., the first display panel) and the G-H LCD layer 730 (i.e., the second display panel).

It should be noted that the PNLC display layer 720 is used in the display device 700 as shown in FIG. 7. In certain embodiments, however, a PDLC display layer can be used to replace the PNLC display layer 720.

In certain embodiments, the structure of the PNLC display layer 720 may be identical to the PNLC device 100 as shown in FIG. 1. Referring to FIG. 1, in certain embodiments, the structure of the PNLC device 100 may correspond to one pixel of the PNLC display layer 720, and a plurality of first pixels may be defined in the PNLC layer (including the PNLC molecules/droplets 130 and the solid polymers 140) of the PNLC device 100. Specifically, as shown in FIG. 1, the first pixel of the PNLC display layer 720 (i.e., the PNLC device 100) may include two glass substrates 102 and 104, a first transparent electrode 110, and a second transparent electrode 120, which may be provided with a voltage difference to form an electric field, such that alignment of the molecules in the PNLC layer (including the PNLC molecules/droplets 130 and the solid polymers 140) may be controlled by the electric field. In certain embodiments, when the outer environment is a bright environment, the display device 700 is switched to the first operational mode, and each first pixel of the PNLC display layer 720 may be switched to a display state for displaying image data. In this case, a voltage difference is provided to the transparent electrodes 110 and 120 of the first pixel of the PNLC display layer 720 in order to control alignment of the PNLC molecules of the first pixel. In this case, external light incident to the first pixel of the PNLC display layer 720 may pass through and be reflected by the first pixel of the PNLC display layer 720 with little scattering, such that the first pixel may display corresponding image data of the pixel. On the other hand, when the outer environment is a dark environment, the display device 700 is switched to the second operational mode, and the PNLC display layer 720 may be turned off to switch to the scattering state, thus functioning as a light guide layer for the G-H LCD layer 730 (i.e., the second display panel). In this case, no voltage difference is provided to the transparent electrodes 110 and 120 of any of the first pixels of the PNLC display layer 720, and the PNLC molecules of the PNLC display layer 720 are randomly arranged in the pixel cell, resulting in scattering of light as the light passes through the cell. Thus, the light emitted by the LED chip 760 passing through the PNLC display layer 720 may be scattered and diffused, and a part of the scattered light will be guided toward the G-H LCD layer 730. For other part of the scattered light being diffused toward other directions, the black film 710 may ensure that the light is not leaked out from the display device 700.

In certain embodiments, the structure of the G-H LCD layer 730 may be identical to the G-H LCD 300 as shown in FIG. 3. Referring to FIG. 3, in certain embodiments, the structure of the G-H LCD 300 may correspond to one pixel of the G-H LCD layer 730, and a plurality of second pixels may be defined in the G-H LCD layer 730. Specifically, as shown in FIG. 3, the G-H LCD 300 has a third transparent electrode 310 and a fourth transparent electrode 320, which may be provided with a voltage difference to form an electric field, such that alignment of the G-H liquid crystal molecules (including the host liquid crystal molecules 330 and the dye molecules 340) in the second pixel of the G-H LCD 300 may be controlled by the electric field. In certain embodiments, when the outer environment is a dark environment, the display device 700 is switched to the second operational mode, and the second pixel of the G-H LCD 300 may be switched to the second display state, which is similar to the opaque state as shown in FIG. 3(b). In this case, each second pixel of the G-H LCD 300 may be either turned on or turned off. For the second pixel being turned on, a voltage difference is provided to the electrodes 310 and 320 of the second pixel of the G-H LCD 300 to form an electric field to control alignment of the G-H liquid crystal molecules to turn on the second pixel, such that the LC molecules 330 and the dye molecules 340 are reoriented by the electric field, which alters the absorption of the light through the material. Thus, the second pixel of the G-H LCD layer 730 does not allow the light emitted by the light source 760 and guided by the PNLC display layer 720 in the scattering state (which functions as a light guide layer) to pass through the second pixel. For the second pixel being turned off, no voltage difference is provided to the electrodes 310 and 320 of the second pixel of the G-H LCD 300, and the second pixel may allow the light emitted by the light source 760 to pass through, resulting in a color pixel. On the other hand, when the outer environment is a bright environment, the display device 700 is switched to the first operational mode, and the G-H LCD 300 may be turned off to switch to the transparent state, as shown in FIG. 3(a). In this case, no voltage difference is provided to the electrodes 310 and 320 of the second pixel of the G-H LCD 300, and the orientation of the dye molecules 340 and the subsequent dipoles are parallel to the host liquid crystal molecules 330, which is along a vertical direction substantially perpendicular to the G-H LCD 300. Thus, the whole G-H LCD layer 730 becomes transparent, allowing the external light incident to the G-H LCD layer 730 and the light reflected by the PNLC display layer 720 to pass through the G-H LCD layer 730.

Figure 8A:
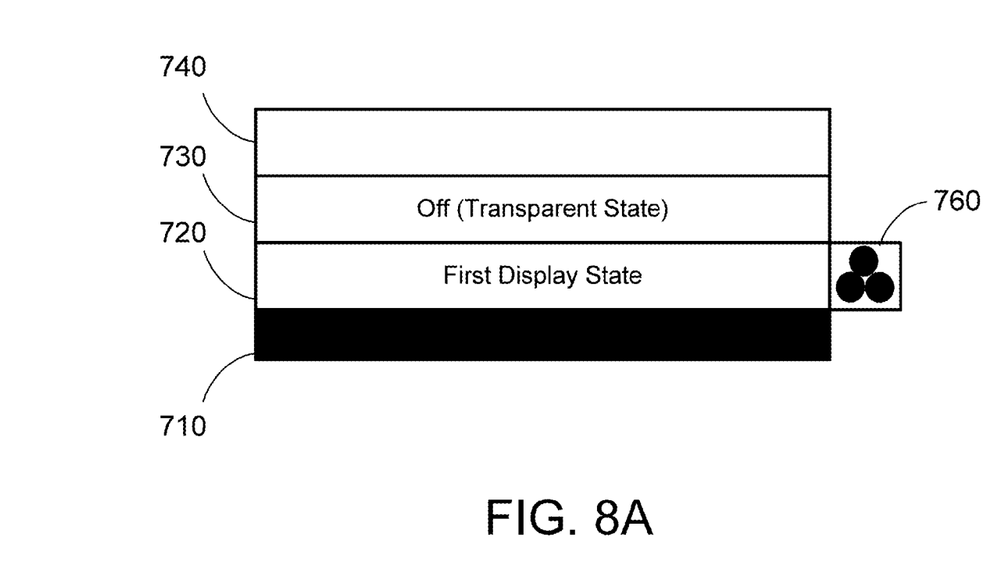
FIG. 8A schematically shows the display device as shown in FIG. 7 in a bright environment according to certain embodiments of the present disclosure.
Figure 8B:
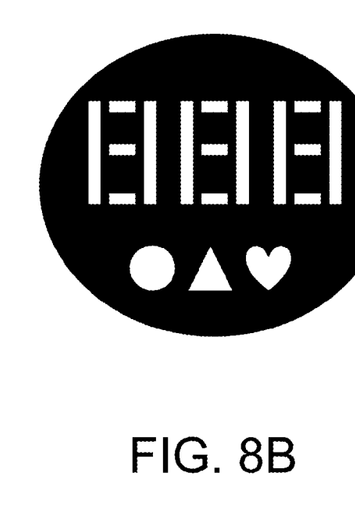
FIG. 8B schematically shows the display device in a bright environment displaying symbols and numbers according to certain embodiments of the present disclosure.

FIG. 8A schematically shows the display device as shown in FIG. 7 in a bright environment according to certain embodiments of the present disclosure. As shown in FIG. 8A, when the outer environment is a bright environment, such as an outdoor area during the day time or a bright room, the display device 700 is switched to the first operational mode. In this case, the PNLC display layer 720 may be switched to a first display state for displaying image data, and the G-H LCD layer 730 may be turned off to switch to the transparent state. The LEDs of the LED chip 760 are also turned off since the external light is available. In this case, the external light from the bright environment is allowed to incident to and pass through the G-H LCD layer 730 in the transparent state and reflected by the PNLC display layer 720 in the first display state. Thus, by controlling each of the first pixels of the PNLC display layer 720 in the way as shown in FIGS. 5B and 5C, the first pixel may display black or white. FIG. 8B schematically shows the display device in a bright environment displaying symbols and numbers according to certain embodiments of the present disclosure. As shown in FIG. 8B, in the area showing the symbols and numbers, the first pixels of the PNLC display layer 720 is fully reflective to show the white color. On the other hand, in the other out-of-image area (i.e., the area outside the symbols and numbers), the first pixels of the PNLC display layer 820 may turn on to be transparent and show the black color due to the black film 710 below the PNLC display layer 720. Further, the area showing the symbols and numbers as shown in FIG. 8B includes multiple regions, and each of the regions corresponds to one or more first pixels of the PNLC display layer 720. In certain embodiments, the regions may be controlled in a region-by-region way, such that some of the regions are fully reflective and other regions are not reflective, in order to display different symbols and/or numbers. In certain embodiments, the PNLC display layer 720 of the display device may work very well in the high reflective display state under the sunlight or other bright environments.

Figure 9A:
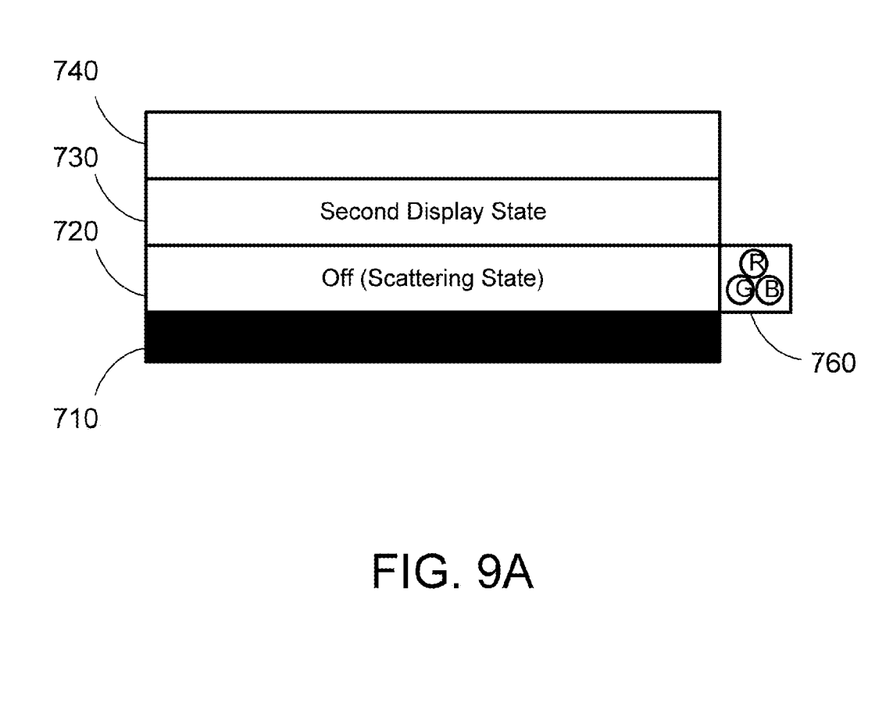
FIG. 9A schematically shows the display device as shown in FIG. 7 in a dark environment according to certain embodiments of the present disclosure.
Figure 9B:
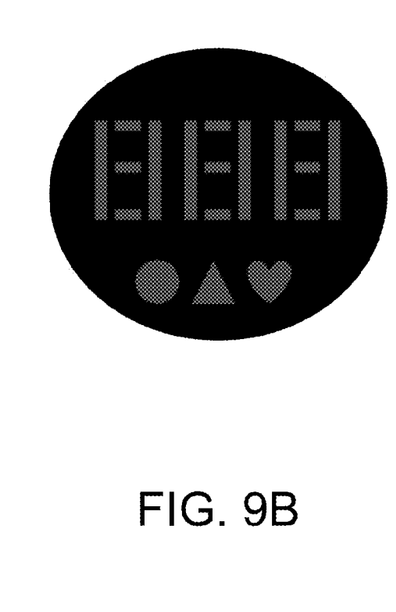
FIG. 9B schematically shows the display device in a dark environment displaying symbols and numbers in a red color according to certain embodiments of the present disclosure.

FIG. 9A schematically shows the display device as shown in FIG. 7 in a dark environment according to certain embodiments of the present disclosure. As shown in FIG. 9A, when the outer environment is a dark environment, such as an indoor dark area or a dark environment during the night time, the display device 700 is switched to the second operational mode. In this case, the PNLC display layer 720 may be turned off to switch to the scattering state, thus functioning as a light guide layer for the G-H LCD layer 730 (i.e., the second display panel), and the G-H LCD layer 730 may be switched to the second display state. In certain embodiments, one or more of the LEDs of the LED chip 760 may also be turned on to provide internal light, since the external light is not available in the dark environment. For example, the red LED of the LED chip 760 may be turned on, while the green and blue LEDs of the LED chip 760 may remain off, such that the LED chip 760 provides red light for the G-H LCD layer 730 in the second display state. In this case, the PNLC display layer 720 in the scattering state may guide the light emitted by the LED chip 760 toward the G-H LCD layer 730, such that each of the second pixels of the G-H LCD layer 730 may display its corresponding data. FIG. 9B schematically shows the display device in a dark environment displaying symbols and numbers in a red color according to certain embodiments of the present disclosure. As shown in FIG. 9B, in the area showing the symbols and numbers, the second pixels of the G-H LCD layer 730 shows the red color. Further, the area showing the symbols and numbers as shown in FIG. 9B also includes multiple regions, and each of the regions corresponds to one or more second pixels of the G-H LCD layer 730. In certain embodiments, the regions may be controlled in a region-by-region way, such that light may transmit out at some of the regions, and other regions are dark regions, in order to display different symbols and/or numbers. In other words, only some of the second pixels that are located in the regions that are not dark regions (i.e., the regions that may allow transmission of light) may be controlled to switch between the second display state and the ON state. On the other hand, in the other out-of-image area (i.e., the area outside the symbols and numbers), the second pixels of the G-H LCD layer 730 may remain opaque (i.e., the ON state) to show the black color. In other words, the G-H LCD layer 730 functions as a mask in this case to block the black area (i.e., the area outside the symbols and numbers) as shown in FIG. 9B.

With the display device 700 as shown in FIG. 7, the overall visibility performance of the display device 700 may be improved in either bright or dark environments.

It should be noted that the embodiment as shown in FIG. 7 uses the PNLC display layer 720 as the first display panel, and the G-H LCD layer 730 as the second display panel. In certain embodiments, other display layer with similar features may be used as the first display panel and/or the second display panel. For example, the first display panel must be switchable between a scattering state and a first display state, and the second display panel must be switchable between a transparent state and a second display state. In the first operational mode, the first display panel is switched to the first display state for displaying image data, and the second display panel is switched to the transparent state and becomes transparent, such that light from the bright environment is allowed to incident to and pass through the second display panel in the transparent state and reflected by the first display panel in the first display state. In the second operational mode, the second display panel is switched to the second display state for displaying the image data, and the first display panel is switched to the scattering state to function as a light guide layer for the second display panel, such that light emitted internally is guided by the first display panel in the scattering state toward the second display panel in the second display state.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display device, comprising:
a black film; and
a light control display stack disposed on the black film, comprising:
a polymer networked liquid crystal (PNLC) or polymer dispersed liquid crystal (PDLC) display disposed on the black film, the PNLC or PDLC display defining a plurality of first pixels and being switchable between a scattering state and a first display state, wherein in the first display state, each of the plurality of first pixels of the PNLC or PDLC display is configured to be turned on to become transparent or be turned off to become translucent, and in the scattering state, each of the plurality of first pixels of the PNLC or PDLC display is configured to be turned off; and
a guest-host (G-H) liquid crystal display (LCD) disposed on the PNLC or PDLC display and facing an outer environment, the G-H LCD defining a plurality of second pixels and being switchable between a transparent state and a second display state, wherein in the second display state, each of the plurality of second pixels of the G-H LCD is configured to be turned off to transmit light emitted internally by a light source of the G-H LCD or be turned on to become opaque, and in the transparent state, each of the plurality of second pixels of the G-H LCD is configured to be turned off to become transparent;
wherein in a first operational mode, the PNLC or PDLC display is configured to switch to the first display state for displaying image data, and the G-H LCD is configured to switch to the transparent state and becomes transparent, such that light from the outer environment is allowed to incident to and pass through the G-H LCD in the transparent state and reflected by the first pixels of the PNLC or PDLC display being turned on in the first display state; and
wherein in a second operational mode, the G-H LCD is configured to switch to the second display state for displaying the image data, and the PNLC or PDLC display is configured to switch to the scattering state to function as a light guide layer for the G-H LCD, such that the light emitted internally by the light source of the G-H LCD is guided by the PNLC or PDLC display in the scattering state toward the G-H LCD in the second display state.

2. The display device of claim 1, wherein the light control display stack further comprises an adhesive layer disposed between the PNLC or PDLC display and the G-H LCD, such that no air gap exists between the PNLC or PDLC display and the G-H LCD.

3. The display device of claim 1, further comprising a glass layer disposed on the G-H LCD facing the outer environment.

4. The display device of claim 1, wherein the PNLC or PDLC display comprises:
a first substrate disposed on the black film;
a second substrate facing the G-H LCD and spaced apart to the first substrate, forming a first cell gap between the first substrate and the second substrate; and
a liquid crystal layer disposed in the first cell gap between the first substrate and the second substrate and having PNLC or PDLC molecules, the liquid crystal layer defining the plurality of first pixels, wherein each of the plurality of first pixels comprises:
a first transparent electrode disposed on the first substrate and facing the liquid crystal layer; and
a second transparent electrode disposed on the second substrate and facing the liquid crystal layer, wherein:
when the PNLC or PDLC display is switched to the first display state, for each of the plurality of first pixels, the first transparent electrode and the second transparent electrode are provided with a voltage difference to form an electric field to control the alignment of the PNLC or PDLC molecules between the first transparent electrode and the second transparent electrode of the first pixel, such that each of the plurality of first pixels is configured to be turned on to become transparent or be turned off to become translucent; and
when the PNLC or PDLC display is switched to the scattering state, for each of the plurality of first pixels, the first transparent electrode and the second transparent electrode are not provided with the voltage difference, such that the PNLC or PDLC molecules of all of the plurality of first pixels are randomly arranged, and the light is scattered and diffused when passing through the PNLC or PDLC display such that the light is guided toward the G-H LCD.

5. The light control device of claim 1, wherein the G-H LCD comprises:
a third substrate facing the PNLC or PDLC display;
a fourth substrate facing the outer environment and spaced apart to the third substrate, forming a second cell gap between the third substrate and the fourth substrate; and
a G-H liquid crystal layer disposed in the second cell gap between the third substrate and the fourth substrate and having G-H liquid crystal molecules, the G-H liquid crystal layer defining a plurality of second pixels, wherein the G-H liquid crystal molecules comprise negative liquid crystal molecules and dichroic dye molecules dissolved in the negative liquid crystal molecules, such that orientations of the dichroic dye molecules and dipoles are parallel to the negative liquid crystal molecules, and wherein each of the plurality of second pixels comprises:
a third transparent electrode disposed on the third substrate and facing the G-H liquid crystal layer; and
a fourth transparent electrode disposed on the fourth substrate and facing the G-H liquid crystal layer, wherein:
when the G-H LCD is switched to the second display state, the light source is turned on, and for each of the plurality of second pixels, the third transparent electrode and the fourth transparent electrode are either provided with a voltage difference to form an electric field to control alignment of the G-H liquid crystal molecules to turn on the second pixel, or not provided with the voltage difference such that the second pixel is turned off, such that the light emitted by the light source and guided by the PNLC or PDLC display in the scattering state is allowed to pass through at least some of the plurality of second pixels being turned off; and
when the G-H LCD is switched to the transparent state, the light source is turned off, and for each of the plurality of second pixels, the third transparent electrode and the fourth transparent electrode are not provided with the voltage difference, such that the G-H liquid crystal molecules of all of the second pixels are arranged to be transparent.

6. The display device of claim 5, wherein the light source is configured to emit the light toward the G-H LCD, and the light source is a light-emitting diode (LED) chip disposed at a side of the PNLC or PDLC display.

7. The display device of claim 6, wherein the LED chip comprises a plurality of LEDs having red (R), green (G) and blue (B) colors.

8. A light control device, comprising:
a first display panel, defining a plurality of first pixels and being switchable between a scattering state and a first display state, wherein in the first display state, each first pixel of the first display panel is configured to be turned on to become transparent or be turned off to become translucent, and in the scattering state, each first pixel of the first display panel is configured to be turned off; and
a second display panel disposed on the first display panel and facing an outer environment, the second display panel defining a plurality of second pixels and being switchable between a transparent state and a second display state, wherein in the second display state, each second pixel of the second display panel is configured to be turned off to transmit light emitted internally by a light source of the second display panel or be turned on to become opaque, and in the transparent state, each second pixel of the second display panel is configured to be turned off to become transparent;
wherein in a first operational mode, the first display panel is configured to switch to the first display state for displaying image data, and the second display panel is configured to switch to the transparent state and becomes transparent, such that light from the outer environment is allowed to incident to and pass through the second display panel in the transparent state and reflected by the first pixels of the first display panel being turned on in the first display state; and
wherein in a second operational mode, the second display panel is configured to switch to the second display state for displaying the image data, and the first display panel is configured to switch to the scattering state to function as a light guide layer for the second display panel, such that the light emitted internally is guided by the first display panel in the scattering state toward the second display panel in the second display state.

9. The light control device of claim 8, wherein no air gap exists between the first display panel and the second display panel.

10. The light control device of claim 9, further comprising an adhesive layer disposed between the first display panel and the second display panel, such that a display stack is formed by laminated layers of the first display panel, the adhesive layer and the second display panel.

11. The light control device of claim 8, further comprising a black film, wherein the first display panel is disposed on the black film.

12. The light control device of claim 8, wherein the first display panel is a polymer networked liquid crystal (PNLC) display or a polymer dispersed liquid crystal (PDLC) display, comprising:
two substrates spaced apart to each other, forming a first cell gap therebetween; and
a liquid crystal layer disposed in the first cell gap between the two substrates and having PNLC or PDLC molecules, the liquid crystal layer defining the plurality of first pixels, wherein:
when the first display panel is switched to the first display state, for each of the plurality of first pixels, a voltage difference is provided to the first pixel to control alignment of the PNLC or PDLC molecules of the first pixel, such that each of the plurality of first pixels is configured to be turned on to become transparent or be turned off to become opaque; and
when the first display panel is switched to the scattering state, the PNLC or PDLC molecules of all of the first pixels are randomly arranged, and the light is scattered and diffused when passing through the first display panel such that the light is guided toward the second display panel.

13. The light control device of claim 12, wherein each of the plurality of first pixels comprises:
a first transparent electrode disposed on one of the two substrates and facing the liquid crystal layer; and
a second transparent electrode disposed on the other of the two substrates and facing the liquid crystal layer, wherein:
when the first pixel is turned on, the first transparent electrode and the second transparent electrode are provided with the voltage difference to form an electric field to control the alignment of the PNLC or PDLC molecules between the first transparent electrode and the second transparent electrode; and
when the first pixel is turned off, the first transparent electrode and the second transparent electrode are not provided with the voltage difference, such that the PNLC or PDLC molecules between the first transparent electrode and the second transparent electrode are randomly arranged.

14. The light control device of claim 9, wherein the second display panel is a guest-host (G-H) liquid crystal display (LCD), comprising:
two substrates spaced apart to each other, forming a second cell gap therebetween; and
a G-H liquid crystal layer disposed in the second cell gap between the two substrates and having G-H liquid crystal molecules, the G-H liquid crystal layer defining a plurality of second pixels, wherein the G-H liquid crystal molecules comprise negative liquid crystal molecules and dichroic dye molecules dissolved in the negative host liquid crystal molecules, such that orientations of the dichroic dye molecules and dipoles are parallel to the negative liquid crystal molecules, wherein:
when the second display panel is switched to the second display state, the light source is turned on, and for each of the plurality of second pixels, either a voltage difference is provided to the second pixel to control alignment of the G-H liquid crystal molecules to turn on the second pixel, or no voltage difference is provided to the second pixel to turn off the second pixel, such that the light emitted by the light source and guided by the first display panel in the scattering state is allowed to pass through at least some of the second pixels being turned off; and
when the second display panel is switched to the transparent state, the light source is turned off, and for each of the plurality of second pixels, the G-H liquid crystal molecules of all of the second pixels are arranged to be transparent.

15. The light control device of claim 14, wherein each of the plurality of second pixels comprises:
- a third transparent electrode disposed on one of the two substrates and facing the G-H liquid crystal layer; and
- a fourth transparent electrode disposed on the other of the two substrates and facing the G-H liquid crystal layer, wherein:
- when the second pixel is turned on, the first transparent electrode and the second transparent electrode are provided with the voltage difference to form an electric field to control alignment of the G-H liquid crystal molecules between the third transparent electrode and the fourth transparent electrode; and
- when the second pixel is turned off, the third transparent electrode and the fourth transparent electrode are not provided with the voltage difference, such that the G-H liquid crystal molecules between the third transparent electrode and the fourth transparent electrode are arranged to be transparent.

16. The light control device of claim 14, wherein the light source is configured to emit the light toward the second display panel, and the light source is a light-emitting diode (LED) chip disposed at a side of the PNLC or PDLC display.

17. The light control device of claim 16, wherein the LED chip comprises a plurality of LEDs having red (R), green (G) and blue (B) colors.

18. A display device, comprising:
a black film; and
a light control display stack disposed on the black film, comprising:
- a first display panel disposed on the black film, and being switchable between a scattering state and a first display state; and
- a second display panel disposed on the first display panel and facing an outer environment, the second display panel being switchable between a transparent state and a second display state,
wherein the first display panel comprises a liquid crystal layer, and the second display panel comprises a light-emitting diode (LED) light source disposed at a side of the first display panel and aligned to the liquid crystal layer of the first display panel.

19. The display device of claim 18, wherein the first display panel is a polymer networked liquid crystal (PNLC) or polymer dispersed liquid crystal (PDLC) display, and the second display panel is a guest-host (G-H) liquid crystal display (LCD).

20. The display device of claim 18, wherein the LED light source comprises a plurality of LEDs having red (R), green (G) and blue (B) colors.

* * * * *